(12) United States Patent
Wright et al.

(10) Patent No.: US 6,859,868 B2
(45) Date of Patent: Feb. 22, 2005

(54) OBJECT ADDRESSED MEMORY HIERARCHY

(75) Inventors: Gregory M. Wright, Mountain View, CA (US); Mario I. Wolczko, San Carlos, CA (US); Matthew L. Seidl, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/072,169

(22) Filed: Feb. 7, 2002

(65) Prior Publication Data

US 2003/0149858 A1 Aug. 7, 2003

(51) Int. Cl.$^7$ ............................................. G06F 12/00
(52) U.S. Cl. ..................... 711/207; 711/113; 711/118; 711/202; 711/205; 711/203; 707/206
(58) Field of Search ................................. 711/113, 118, 711/202, 203, 205–207; 707/206

(56) References Cited

U.S. PATENT DOCUMENTS

| | | | |
|---|---|---|---|
| 4,731,740 A | 3/1988 | Eguchi | 364/200 |
| 5,317,704 A | 5/1994 | Izawa et al. | 395/400 |
| 5,590,061 A | 12/1996 | Hollowell, II et al. | |
| 5,798,918 A | 8/1998 | Georgiou et al. | |
| 5,835,885 A | 11/1998 | Lin | |
| 5,953,685 A | 9/1999 | Bogin et al. | |
| 6,070,173 A | * 5/2000 | Huber et al. | 707/206 |
| 6,173,217 B1 | 1/2001 | Bogin et al. | |
| 6,240,484 B1 | * 5/2001 | Witt | 711/3 |
| 6,263,448 B1 | 7/2001 | Tsern et al. | |
| 6,446,188 B1 | * 8/2002 | Henderson | 711/206 |
| 2002/0103819 A | * 12/2000 | Duvillier | 707/206 |
| 2002/0178341 A1 | * 11/2002 | Frank | 711/216 |

FOREIGN PATENT DOCUMENTS

WO    WO 01/018653 A1    3/2001    ........... G06F/12/10

OTHER PUBLICATIONS

European Search Report dated Mar. 30, 2004 (3 pgs.).
I. Williams and M. Wolczko, "An Object–Based Memory Architecture," Implementing Persistent Object Bases: Proc. Fourth Int'l Workshop on Persistent Object System, morgan Kaufmann, 1991, pp. 114–130.
M. Wolczko and I. Williams, "Multi–level Garbage Collection in a High–Performance Persistant Object System," appeared in the Proceedings of the Fifth Int'l Workshop on Persistent Object Systems, Pisa, Italy, Sep. 1–4, 1992, 23 pages.

* cited by examiner

Primary Examiner—Kimberly McLean-Mayo
(74) Attorney, Agent, or Firm—Osha & May L.L.P.

(57) ABSTRACT

A computer system including a processor, an object cache operatively connected to the processor, a memory, and a translator interposed between the object cache and the memory, wherein the translator maps an object address to a physical address within the memory.

28 Claims, 3 Drawing Sheets

OBJECT ADDRESSED MEMORY HIERARCHY

BACKGROUND OF INVENTION

As object-based systems become widespread, large object stores are becoming more common. As processor speeds rise, these object stores need to provide fast access to large collections of persistent objects so they do not become a bottleneck in system throughput. To date, most object stores have been implemented using stock hardware, by emulation in software. While acceptable as an initial solution, it is possible that large performance gains are to be had by using architectures more suited to the task at hand.

FIG. 1 illustrates an example of a conventional memory hierarchy for a multiprocessor. The multiprocessor includes two processors (10, 12) each connected to a Translation Look-aside Buffer (TLB) (14, 16). Each TLB (14, 16) is associated with an L1 Cache (18, 20). The L1 caches (18, 20) are subsequently connected to a single L2 Cache (22) which is connected to a memory (24).

The TLB (14, 16) holds the physical addresses associated with a subset of the virtual address space for a small number of recently-used translations. The translations map virtual addresses to physical addresses. The translations may be computed (and entered into the TLB) either in software or in hardware. The L1 Cache (18, 20) is a form of fast memory holding recently accessed data, designed to speed up subsequent access to the same data. The L1 Cache (18, 20), specifically, is located on or close to the microchip containing the processor (10, 12). The L2 Cache (22) is similar to the L1 Cache (18, 20) except that it contains data that was not as recently accessed as the data in the L1 Cache (18, 20). Additionally, the L2 Cache (22) typically has a larger memory capacity and a slower access time. The memory (24) is typically random access memory (RAM).

When a load request is generated on the conventional architecture as shown in FIG. 1, a virtual address is sent from the processor (10, 12) to the corresponding TLB (14, 16), i.e., Processor A (10) sends the virtual address to Translation Look-aside Buffer A (14) and Processor B (12) sends the virtual address to Translation Look-aside Buffer B (16). The TLB (14, 16) converts the virtual address into a physical address that is subsequently sent to the L1 Cache (18, 20). Associated with the L1 Cache is an L1 Cache tag array. The L1 Cache tag array is an index of data stored in the L1 Cache (18, 20). If the physical address, sent from the TLB (14, 16) to the L1 Cache (18, 20), is present in the L1 Cache tag array, then the datum corresponding to the physical address is retrieved and sent to the requesting processor (10, 12). If the physical address is not present in the L1 Cache tag array, then the L1 Cache (18, 20) forwards the physical address to the L2 Cache (22). Similarly, the L2 Cache (22), is associated with an L2 Cache tag array.

If the physical address is found in the L2 Cache tag array, then a cache line associated with the physical address is retrieved and sent to the L1 Cache (18, 20). The cache line is the unit of transfer between the L2 Cache (22) and the L1 Cache (18, 20). Once the L1 Cache (18, 20) receives the cache line, the L1 Cache retrieves and forwards the requested datum within the cache line to the requesting processor (10, 12).

If the physical address is not found in the L2 Cache tag array, then the L2 Cache (22) forwards the physical address to memory (24). Once the physical address is found in memory (24), the entire cache line on which the requested datum is located is retrieved and sent to the L2 Cache (22). The L2 Cache (22) subsequently forwards the entire cache line to the appropriate L1 Cache (18, 20). Upon receipt of the entire cache line, the L1 Cache (18, 20) forwards the requested datum within the cache line to the appropriate processor (10, 12).

There are three existing approaches to implementing an object store. Two are software-based, and map the object store onto a conventional memory hierarchy, such as that described above. The third is hardware-based.

In the first approach, a location-independent object ID (OID) is used to index a data structure known as an object table. The object table maps the OID to the virtual address of the start of the object. In this scheme, two memory references are required to access an object: one to index the object table, and one to index the object given its base address from the object table. Each of these accesses proceeds in the manner described above (from the processor through the TLB to the L1 cache, and thence to the L2 cache and the memory as necessary).

In the second approach, a reference to an object is a direct pointer to the start of the object. This eliminates the extra access required by the object table in the first approach, but means that an object cannot be relocated within the address space (e.g., for compaction or clustering) without all references to that object being updated. In contrast, when using an object table, only the address in the object table needs to change when an object is relocated.

A third approach is to build a hardware object cache, see Ifor W. Williams and Mario I. Wolczko, An object-based memory architecture, in Alan Dearle, Gail M. Shaw, and Stanley B. Zdonik, editors, *Implementing Persistent Object Bases: Principles and Practice* (*Proceedings of the Fourth International Workshop on Persistent Object Systems*), pages 114–130, Martha's Vineyard, Mass., September 1990. This does not use the conventional memory hierarchy, but instead the processor and caches are modified to directly use object addresses. An object address includes an OID and an offset. In this scheme, the memory system can only store objects; there is no provision for non-object data. The OID and a portion of the offset are used by the tag array to locate a cache line that contains the requested word. The low order bits of the offset are then used to obtain the requested word within the cache line. The object cache is typically implemented in hardware, with software used to manage filling the cache and evictions from the cache. Further, if there is a cache miss, i.e., a load request that can not be satisfied by the cache, a software translator (not shown) converts the object address into a physical address prior to sending the physical address to the memory.

SUMMARY OF INVENTION

In general, in one aspect the invention relates to a computer system comprising a processor, an object cache operatively connected to the processor, a memory, and a translator interposed between the object cache and the memory, wherein the translator maps an object address to a physical address within the memory.

In general, in one aspect, the invention relates to a computer system comprising a plurality of processors, an object cache operatively connected to the plurality of processors, a memory, and a translator interposed between the object cache and the memory, wherein the translator maps an object address to a physical address within the memory.

In general, in one aspect, the invention relates to a method for retrieving an object in a single processor environment comprising obtaining an object address corresponding to the object, determining if the object address corresponds to a tag in a tag array of a cache, retrieving the object if the tag corresponding to the object address is in the tag array, translating the object address into a physical address if the object address is not in the tag array, and retrieving the object using the physical address if the object address is not in the tag array.

In general, in one aspect, the invention relates to a method for retrieving an object in a multiprocessor environment comprising obtaining an object address corresponding to the object, determining if the object address corresponds to a tag in a tag array of a cache, retrieving the object if the tag corresponding to the object address is in the tag array, translating the object address into a physical address if the object address is not in the tag array, and retrieving the object using the physical address if the object address is not in the tag array.

Other aspects and advantages of the invention will be apparent from the following description and the appended claims.

DETAILED DESCRIPTION

The invention relates to an object-addressed memory hierarchy. Further, the invention relates to a hardware based translator used in the object-addressed memory hierarchy. Further, the invention relates to an extended address encoding procedure for distinguishing physical addresses from object addresses in a processor.

Figure 2:
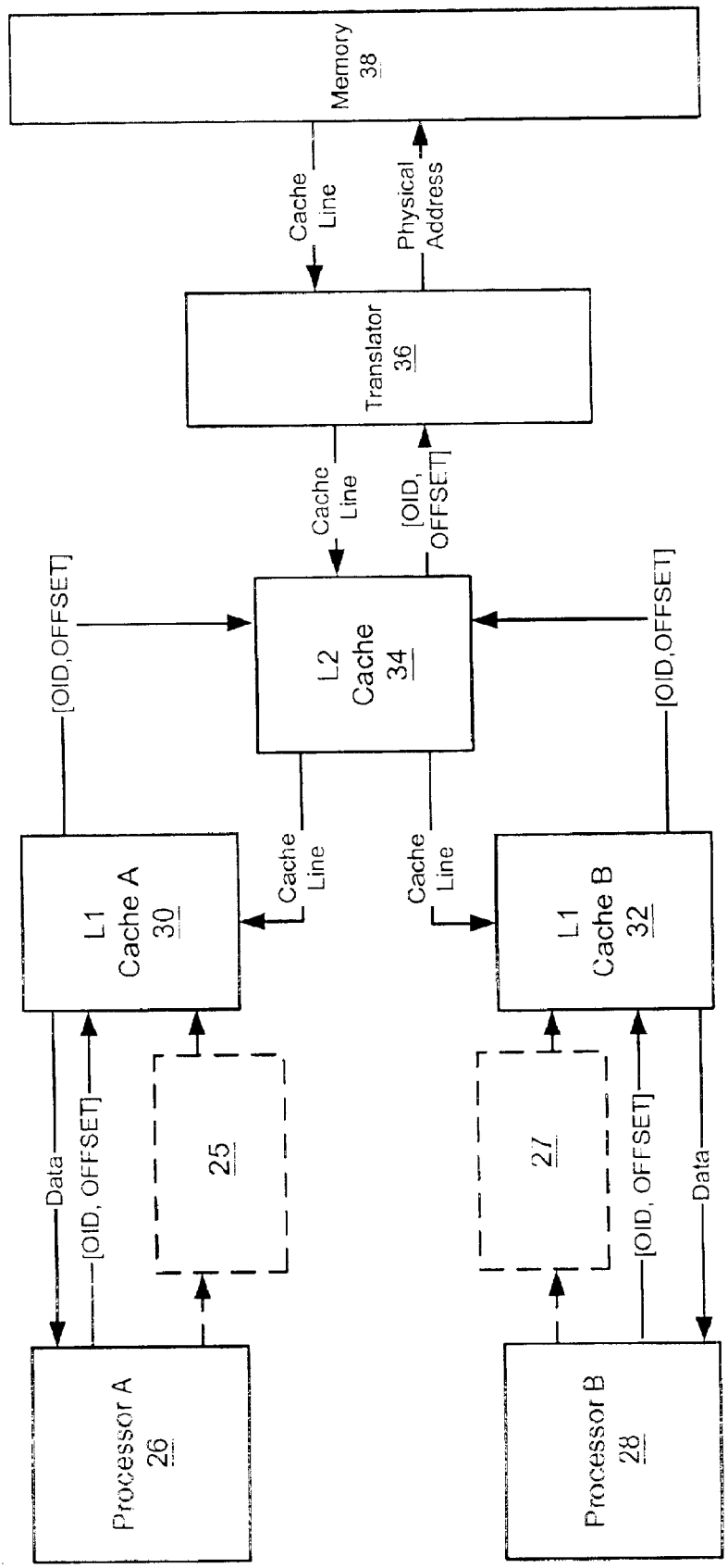
FIG. 2 illustrates an object-addressed memory hierarchy for a multiprocessor environment in accordance with one embodiment of the invention.

FIG. 2 illustrates an object addressed memory hierarchy for a multiprocessor environment in accordance with one embodiment of the invention. The multiprocessor environment includes two processors (26, 28), each associated with an L1 Cache (30, 32). Both L1 Caches (26, 28) are connected to an L2 Cache (34). The L2 Cache (34) is subsequently connected to a translator (36), which is connected to a memory (38).

When a load request for an object is generated on the object-addressed memory hierarchy shown in FIG. 2, an object address is sent to the appropriate L1 Cache (30, 32). The object address includes an OID and an offset. Prior to sending the object address to the L1 Cache (30, 32), the object address is encoded using an extended address encoding procedure described below.

Figure 1:
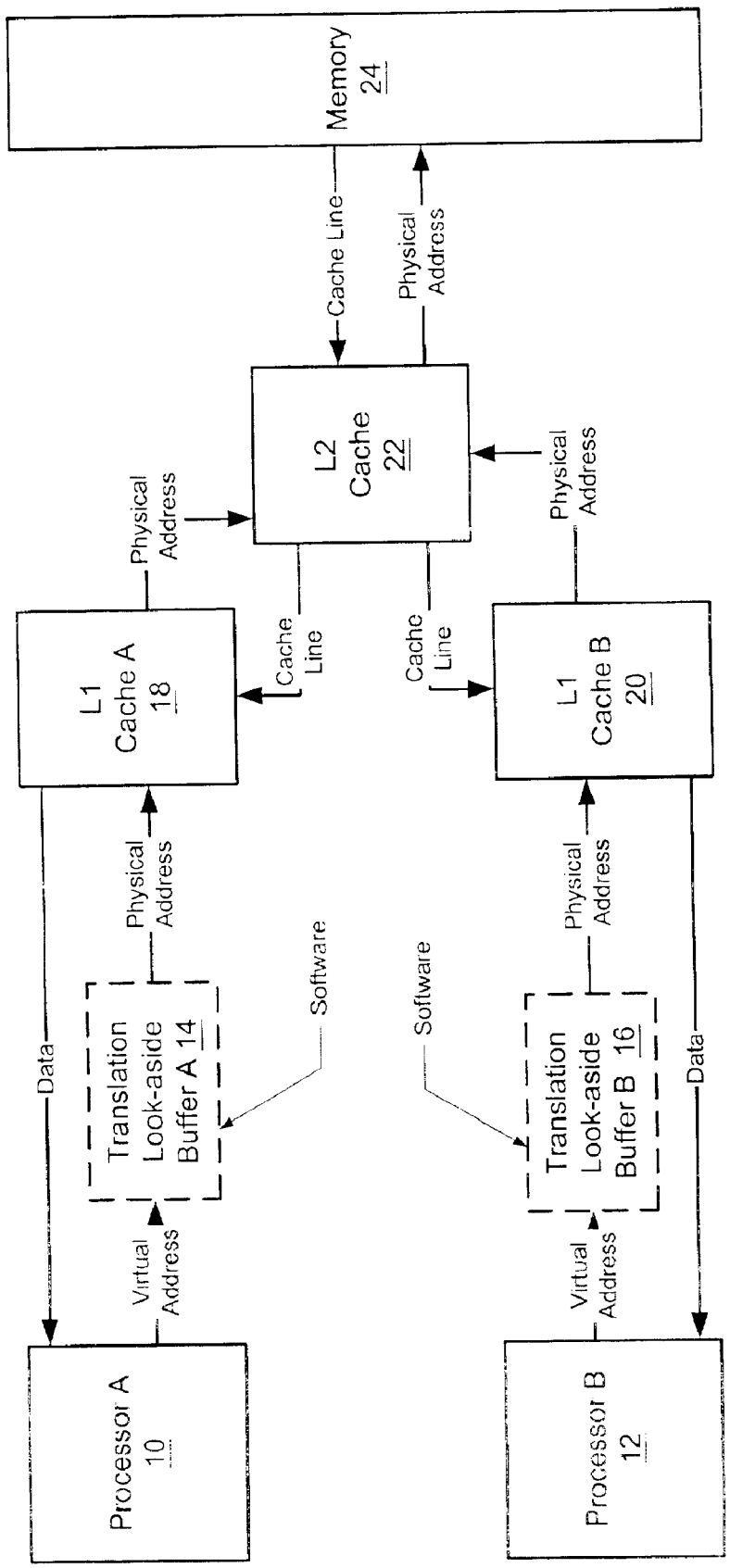
FIG. 1 illustrates a memory hierarchy for a multiprocessor environment.

An extended address encoding procedure is used to enable a conventional cache to act as both an object cache and a conventional cache. As described above, in a conventional load operation a virtual address is sent from the processor (10, 12 in FIG. 1) to a TLB (14, 16 on FIG. 1) to translate the virtual address into a physical address that is subsequently used by the L1 Cache (18, 20 in FIG. 1). In the invention, as shown in FIG. 2, if a portion of an object is requested, the processor (26, 28) obtains the corresponding OID and offset, and combines them to create an object address. The extended address encoding procedure is subsequently applied to the object address. The extended address encoding procedure embeds the object address into a unused part of the physical address range, to produce an encoded address. The resulting high bits in the encoded address allow the processor (26, 28) to distinguish physical addresses from object addresses. When the encoded address is subsequently sent from the processor (26, 28), the encoded address bypasses the TLB (25, 27), and directly enters the L1 Cache (30, 32).

In the invention, if a non-object is requested, i.e., a scalar datum, the processor (26, 28) generates a virtual address that is subsequently intercepted and translated by the TLB (25, 27). The physical address output by the TLB (25, 27) is subsequently sent to the L1 Cache (30, 32).

The L1 Cache (30, 32) upon receiving the physical address or encoded address, searches the tag array for a tag that matches the physical or encoded address. If a tag matching the physical address or encoded address is present in the tag array then the requested data is retrieved from the L1 Cache (30, 32) and sent back to the requesting processor (26, 28). The low order bits in the physical address or the encoded address are used to identify a word within the cache line.

If the tag corresponding to the encoded address is not present in the tag array of the L1 Cache (30, 32), the encoded address is forwarded to an L2 Cache (34). The same process described above for the L1 Cache (30, 32) is repeated for the L2 Cache (34). If the tag corresponding to the encoded address is present in the tag array of the L2 Cache (34), then the cache line corresponding to the encoded address is retrieved and sent to the appropriate L1 Cache (30, 32). The bits in the encoded address denoting the offset are then used to retrieve the particular word requested from within the object. The retrieved word is subsequently sent back to the requesting processor (26, 28).

If the object is not present in the L2 Cache, then the encoded address is forwarded to a translator (36). The translator intercepts cache misses, i.e., a load request that can not be satisfied by the cache, and evictions of cache lines with encoded addresses from the cache, e.g., L1 Cache (30, 32), L2 Cache (34), etc. The translator (36) uses an object table to obtain a physical address corresponding to the encoded address. In one embodiment of the invention, the object table is built using objects that reside in virtual memory. For each object in memory there is a corresponding object table entry that contains the corresponding physical address. The translator (36) uses the encoded address, specifically the OID as an index into the table to obtain a physical address for the encoded address.

When a cache miss for an object occurs, the translator (36) intercepts the encoded address and extracts the OID. Using the OID, the translator (36) searches the object table (not shown) for the corresponding physical address. Once the physical address has been found, the translator (36) converts the load request for the object into a load request for a physical address in memory (38). The load request uses the physical address with a portion of the offset to locate a specific cache line or cache lines in memory (24). The translator (36) issues the load request and subsequently receives the cache line corresponding to the physical address. The translator (36) forwards the cache line to the L1 Cache (30, 32) via the L2 Cache (34). The L1 Cache (30, 32) subsequently uses the low order bits of the offset to forward the requested word to the requesting processor (26, 28).

One skilled in the art will appreciate that physical cache lines and object cache lines may not always align. For example, physical cache lines may have a length of 64 bytes and always start on a physical address which is a multiple of 64. Objects, however, may start on any physical address which is a multiple of 4. Thus, a 64-byte object line for an object starting at address 44 would include addresses (44 . . . 107), which would overlap with the physical cache lines (0 . . . 63) and (64 . . . 127). In this case, a particular object may be split across two physical cache lines requiring two physical cache line loads to obtain the entire object cache line being requested. Once both physical cache lines have been retrieved, the portions of the cache line that are being requested are kept while the other portions are discarded. The requested portions are then concatenated to produce the requested cache line. This functionality is handled by the translator (36).

In the event of a cache eviction, the translator (36) converts the encoded address containing the OID and offset into a physical address. The translator (36) subsequently takes the physical address and generates a store command that may be used by the memory (38) to store the evicted cache line.

Further, if the object-addressed memory hierarchy uses in-cache creation of objects, then the translator may be used to allocate physical memory the first time a part of an object is evicted from the cache, e.g., L1 Cache (30, 32), L2 Cache (34), etc.

While only two cache levels were shown in FIG. 2, those skilled in the art will appreciate that the invention may be used with any single or multi-level cache structure. Further, while FIG. 2 describes a multiprocessor environment having two processors, those skilled in the art will appreciate that the invention may be used with any number of processors. Additionally, the invention may also be used in a single processor environment. Further, those skilled in the art will appreciate that the processor within the invention is modified to handle the extended address encoding procedure and object addresses. Further, in one embodiment of the invention a virtual machine, a Java™ Virtual Machine, running on a processor is modified to generate requests for portions of an object using an OID and an offset.

Figure 3:
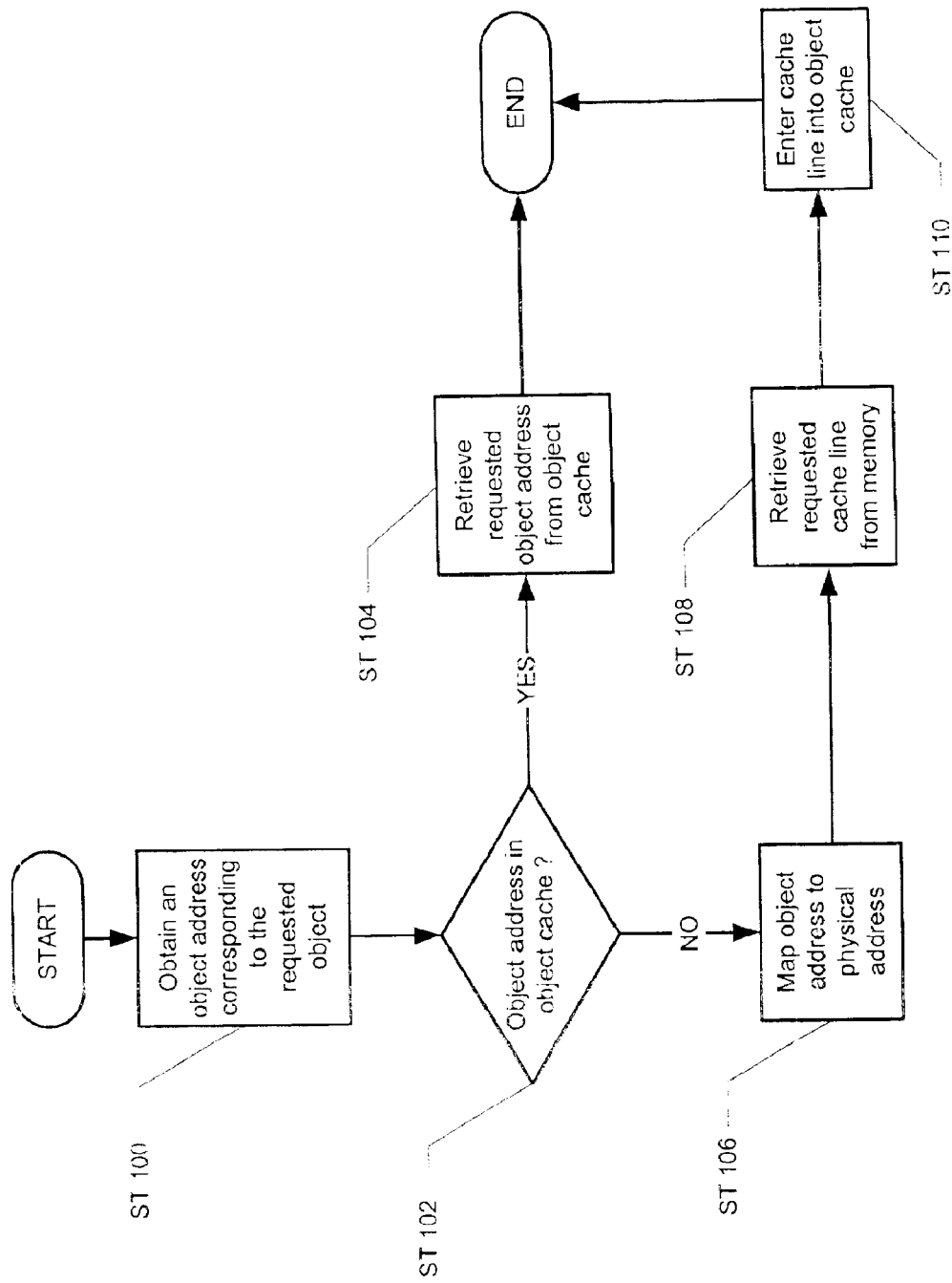
FIG. 3 illustrates a flowchart in accordance with one embodiment of the invention.

FIG. 3 illustrates a flowchart in accordance with one embodiment of the invention. An encoded address is obtained by the object cache that corresponds to an object requested, for example, by a virtual machine (Step 100). The object cache subsequently searches the tag array for a tag that matches the encoded address to determine if the requested object address is in the object cache (Step 102). If the requested object address is in the object cache, then the requested object is subsequently retrieved from the object cache (Step 104). Depending on which cache level the object is located, e.g., L1 cache, L2 Cache, etc., a cache line containing the requested object, or a word within the requested object may be retrieved as described above. If the object is not found in the cache, e.g., L1 Cache, L2 Cache, etc., then the encoded address is mapped to a physical address using a translator (Step 106). The requested object is subsequently retrieved, as described above, from memory (Step 108). The cache line corresponding to the object is then entered into the object cache (Step 110).

Those skilled in the art will appreciate that while only a load request was described with respect to the object-addressed memory hierarchy, a store request may also be performed in the same manner.

The invention has one or more of the following advantages. The invention is implemented entirely in hardware resulting in a performance gain for object retrieval. Further, the invention utilizes an extended address encoding procedure that allows the invention to optimize performance with object retrieval and still use conventional cache coherency protocols. Further, the invention allows cache lines corresponding to object addresses and cache lines corresponding to non-object addresses to exist in the same cache. Further, the invention allows objects to be relocated within the memory without modifying all references to the objects. Further, the invention is scalable such that it may be implemented in a multiprocessor, multiple object cache environment. Further, the invention may perform physical address allocation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer system comprising:
   a processor;
   a cache operatively connected to the processor, wherein the cache is configured to operate as both an object cache and a conventional cache using an extended address encoding procedure;
   a memory; and
   a translator interposed between the cache and the memory, wherein the translator maps an encoded address to a physical address within the memory,
   wherein the encoded address corresponds to an address comprising an object address embedded in an unused part of a physical address range of the address.

2. The computer system of claim 1, wherein the object address comprises an object identification number and an offset.

3. The computer system of claim 1, wherein the translator maps the encoded address to the physical address using a table.

4. The computer system of claim 1, wherein the processor uses an extended instruction set.

5. The computer system of claim 1, wherein the translator converts operations using the encoded address into operations using the physical address.

6. The computer system of claim 1, wherein the translator loads a plurality of cache lines from the memory.

7. The computer system of claim 1, wherein the translator allocates physical memory a first time a portion of an object is evicted from the object cache.

8. A computer system comprising:
   a plurality of processors;
   a cache operatively connected to the plurality of processors, wherein the cache is configured to operate as both an object cache and a conventional cache using an extended address encoding procedure;
   a memory; and
   a translator interposed between the cache and the memory, wherein the translator maps an encoded address to a physical address within the memory,
   wherein the encoded address corresponds to an address comprising an object address embedded in an unused part of a physical address range of the address.

9. The computer system of claim 8, wherein the object address comprises an object identification number and an offset.

10. The computer system of claim 8, wherein the translator maps the encoded address to the physical address using a table.

11. The computer system of claim 8, wherein the plurality of processors uses an extended instruction set.

12. The computer system of claim 8, wherein the translator converts operations using the encoded address to operations using the physical address.

13. The computer system of claim 8, wherein the translator loads a plurality of cache lines from the memory.

14. The computer system of claim 8, wherein the translator allocates physical memory a first time a portion of an object is evicted from the object cache.

15. A method for retrieving an object in a single processor environment comprising:

obtaining an encoded address corresponding to the object;

determining if the encoded address corresponds to a tag in a tag array of a cache;

retrieving the encoded address if the tag corresponding to the object address is in the tag array;

translating the encoded address into a physical address if the object address is not in the tag array; and retrieving a cache line using the physical address if the encoded address is not in the tag array, wherein the encoded address corresponds to an address comprising an object address embedded in an unused part of a physical address range of the address.

16. The method of claim 15, further comprising: entering the cache line into the cache.

17. The method of claim 15, wherein the object address comprises an object identification number and an offset.

18. The method of claim 17, wherein a word within the object is retrieved using the offset.

19. The method of claim 15, wherein the step of translating the encoded address uses a translator.

20. The method of claim 19, wherein the translator converts operations using the encoded address to operations using the physical address.

21. The method of claim 19, wherein the translator loads a plurality of cache lines from the memory.

22. A method for retrieving an object in a multiprocessor environment comprising:

obtaining an encoded address corresponding to the object;

determining if the encoded address corresponds to a tag in a tag array of a cache;

retrieving the encoded address if the tag corresponding to the object address is in the tag array;

translating the encoded address into a physical address if the object address is not in the tag array; and retrieving a cache line using the physical address if the encoded address is not in the tag array, wherein the encoded address corresponds to an address comprising an object address embedded in an unused part of a physical address range of the address.

23. The method of claim 22, further comprising: entering the cache line into the cache.

24. The method of claim 22, wherein the object address comprises an object identification number and an offset.

25. The method of claim 24, wherein a word within the object is retrieved using the offset.

26. The method of claim 22, wherein the step of translating an encoded address uses a translator.

27. The method of claim 26, wherein the translator converts operations using the encoded address to operations using the physical address.

28. The method of claim 26, wherein the translator loads a plurality of cache lines from the memory.

* * * * *